US007675555B2

(12) United States Patent
Aridome et al.

(10) Patent No.: US 7,675,555 B2
(45) Date of Patent: Mar. 9, 2010

(54) RECORDING METHOD, RECORDING APPARATUS, RECORDING MEDIUM, REPRODUCTION METHOD, REPRODUCTION APPARATUS AND IMAGE PICKUP APPARATUS

(75) Inventors: Kenichiro Aridome, Kanagawa (JP); Katsumi Matsuno, Kanagawa (JP); Osamu Date, Tokyo (JP)

(73) Assignee: Sony Corporation, Tokyo (JP)

( * ) Notice: Subject to any disclaimer, the term of this patent is extended or adjusted under 35 U.S.C. 154(b) by 664 days.

(21) Appl. No.: 10/511,609

(22) PCT Filed: Feb. 24, 2004

(86) PCT No.: PCT/JP2004/002134

§ 371 (c)(1),
(2), (4) Date: Nov. 4, 2004

(87) PCT Pub. No.: WO2004/086759

PCT Pub. Date: Oct. 7, 2004

(65) Prior Publication Data

US 2005/0175321 A1    Aug. 11, 2005

(30) Foreign Application Priority Data

Mar. 25, 2003  (JP)  ............................. 2003-083143
Jun. 18, 2003  (JP)  ............................. 2003-172780

(51) Int. Cl.
*H04N 5/76* (2006.01)
*H04N 7/12* (2006.01)
*H04N 11/02* (2006.01)
*H04N 11/04* (2006.01)
*H04N 5/91* (2006.01)
*H04N 7/26* (2006.01)

(52) U.S. Cl. .............................. 348/231.3; 348/231.99; 348/231.2; 375/240.01; 375/240.26; 386/96

(58) Field of Classification Search ............ 348/231.99, 348/231.2, 231.3; 375/240.01, 240.26; 386/95, 386/96
See application file for complete search history.

(56) References Cited

U.S. PATENT DOCUMENTS 5,574,505 A * 11/1996  Lyons et al. ............ 375/240.26
6,438,317 B1 *  8/2002  Imahashi et al. ............ 386/109

(Continued)

FOREIGN PATENT DOCUMENTS

EP    0 757 484 A2    2/1997

(Continued)

*Primary Examiner*—Tuan Ho
*Assistant Examiner*—Wanda M Negron
(74) *Attorney, Agent, or Firm*—Oblon, Spivak, McClelland, Maier & Neustadt, L.L.P.

(57) ABSTRACT

The present invention provides a recording method capable of reliably associating additional information for data of a decoding/reproduction unit with the decoding/reproduction unit for a case in which data of a read/write unit for a recording medium includes a plurality of aforementioned decoding/reproduction units. Time-series information is compressed before being recorded on the recording medium. Management information added to data of each decoding/reproduction unit of the compressed time-series information as management information for a decoding/reproduction process is also recorded on the recording medium. Additional information for data of a decoding/reproduction unit is also recorded on the recording medium by being associated with management information for a decoding/reproduction process of data of the decoding/reproduction unit.

35 Claims, 9 Drawing Sheets

U.S. PATENT DOCUMENTS

| | | | | |
|---|---|---|---|---|
| 6,671,323 | B1 * | 12/2003 | Tahara et al. | 375/240.26 |
| 6,801,575 | B1 * | 10/2004 | Crinon | 375/240.26 |
| 2002/0018644 | A1 * | 2/2002 | Isobe et al. | 386/95 |

FOREIGN PATENT DOCUMENTS

| | | |
|---|---|---|
| JP | 8-214265 | 8/1996 |
| JP | 11-203838 | 7/1999 |
| JP | 2000-253398 | 9/2000 |
| JP | 2001-188686 | 7/2001 |
| JP | 2003-78859 | 3/2003 |
| JP | 2003-224810 | 8/2003 |
| WO | WO00/46989 * | 8/2000 |
| WO | WO 02/061596 A1 | 8/2002 |

* cited by examiner

F I G. 5

(A) VOBU | VOBU | ⋯ | VOBU (B) NV_PCK | ARI_PCK0 | ARI_PCK1 | ⋯ | ARI_PCK14 | V_PCK_I2 | ⋯ | V_PCK_I2 | V_PCK_B0 | V_PCK_B1 | ⋯

ADDITIONAL INFORMATION

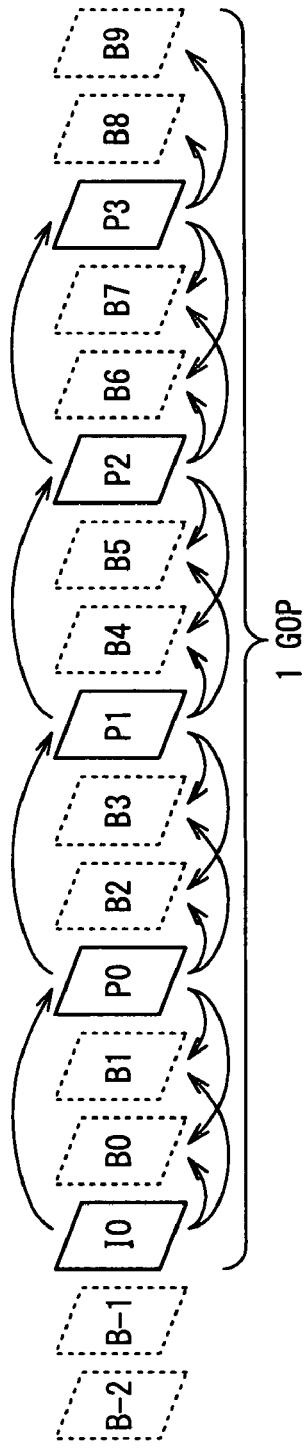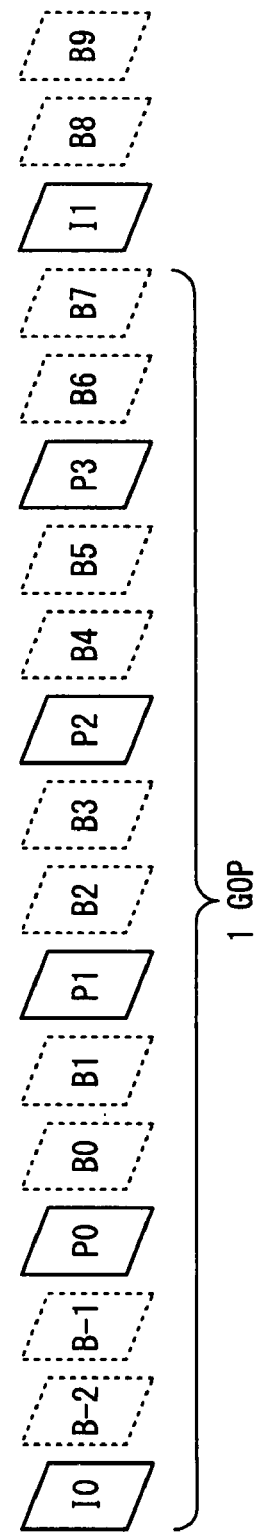

RECORDING METHOD, RECORDING APPARATUS, RECORDING MEDIUM, REPRODUCTION METHOD, REPRODUCTION APPARATUS AND IMAGE PICKUP APPARATUS

TECHNICAL FIELD

The present invention relates to a recording method for compressing time-series information such as video and audio information and recording the compressed information onto a recording medium such as a disk, relates to a recording apparatus adopting the recording method as well as relates to a reproduction method and a reproduction apparatus, which are provided as counterparts of the recording method and the recording apparatus respectively.

BACKGROUND ART

In an operation to record time-series information such as video and audio information onto a recording medium such as a disk, a tape or a semiconductor memory, for example, the time-series information is generally compressed to allow the time-series information continuing over a long period of time to be recorded in a limited area in the recording medium.

As the conventional method of compressing data, an MPEG (Moving Picture Experts Group) method is used widely.

The MPEG method is a technique for compressing data by using predictive coding based on correlations between pieces of information in video frames or video fields and utilizing a DCT (Discrete Cosine Transform) process. The video frames or the video fields are decoding/reproduction units of video information.

In the MPEG method, a picture, which can be a frame or a field, can have one of three types, i.e. an I picture, a P picture and a B picture. In order to simplify the explanation, however, only the technical term 'frame' is used as the decoding/reproduction unit of video information in the following description.

The I picture is an intra-coded picture obtained as a result of compression and coding only the data in one frame of the picture itself. The P picture is a forward-direction predictive-coded picture obtained as a result of compression and coding of data on the basis of a correlation with a picture frame preceding the frame of the P picture. The B picture is a both-direction predictive-coded picture obtained as a result of compression and coding of data on the basis of correlations with picture frames succeeding and preceding the frame of the B picture.

In the MPEG method, a so-called GOP (Group of Pictures) unit including a plurality of frames is used as a read/write unit, which is a unit of data read-out from and written into a recording medium. Typical GOPs are shown in FIGS. 9A and 9B.

As shown in FIGS. 9A and 9B, a GOP in the MPEG method includes at least one I picture. This is because an image cannot be decoded on the basis of only P and B pictures. By including an I picture in a GOP in this way, a random access to any GOP can be made.

I and P pictures are coded in the same order as the order of the original frames. However, a B picture must be coded after I and P pictures are coded. If this encoding order is to be taken into consideration, in an MPEG encoder, frames are rearranged from the original order shown in FIG. 9A into a new order shown in FIG. 9B before the frames are compressed and coded. For details, refer to Japanese Patent Laid-Open No. Hei8-214265.

To put it in detail, as shown by an arrow in FIG. 9A, a P picture is subjected to predictive coding using an I or P picture preceding the P picture being coded. On the other hand, a B picture is subjected to predictive coding using an I or P picture preceding the B picture and an I or P picture succeeding the B picture. That is to say, the B picture is sandwiched by the I or P picture preceding the B picture and the I or P picture succeeding the B picture.

Since a B picture is encoded-by using an I or P picture succeeding the B picture as described above, in the new order shown in FIG. 9B, the B picture is placed after the I or P picture originally succeeding the B picture before the arrangement.

In addition, as will be described later, management information for decoding and reproduction is added to each decoding/reproduction unit (that is, each picture unit) of the compressed-coded image data and recorded onto a recording medium along with the coded image data. Then, in an operation to reproduce image data coded by adoption of the MPEG method, the management information for decoding and reproduction is extracted from the recorded data and, on the basis of the management information, an image output is controlled in reproduced picture units and the order of the frames is restored to the original one.

By the way, in a digital camera capable of taking a picture of not only a still picture but also a moving picture, the MPEG method is also adopted as a data compression method. The digital camera is capable of offering more convenience to the user if an image pickup time and image pickup conditions can be recorded onto a recording medium as additional information. The image pickup conditions include a diaphragm-setting state, an exposure value and a white-balance state.

In particular, if the additional information such as an image pickup time and image pickup conditions can be recorded for an image of each frame, the user will be capable of knowing how the picture of each frame was taken and enjoy more convenience. In addition, by referring to the additional information for the image of each frame in an image reproduction process or an image-editing process, the reproduction quality can be improved and a fine editing process can be carried out. As a result, it is expected that the present invention can be applied to a variety of applications.

In the transmission format of data recorded by adoption of the MPEG method, however, there is no proposed policy as to how additional information for video and audio data is to be recorded (and transmitted). Thus, there is a technological problem as to how additional information is to be added in a state allowing the information to be used with a high degree of convenience.

In this case, if a GOP serving as a unit of data read out from and written into a recording medium includes a plurality of picture frames each used as a decoding/reproduction unit as is the case with the MPEG method described above, in an attempt to record additional information for data of each decoding/reproduction unit, a technique as to how the additional information is associated with the data of each decoding/reproduction unit is important.

In particular, when frames in a GOP serving as a read/write unit in the MPEG method are rearranged in a coding process prior to a recording process into a new order shown in FIG. 9B as described earlier, there is raised a problem that it becomes difficult to associate the data of each decoding/reproduction unit with the additional information.

It is thus an object of the present invention addressing the problems described above to provide a recording method capable of associating additional information for data of each decoding/reproduction unit with the unit with a high degree of reliability even if a read/write unit of data read out from and written into a recording medium includes a plurality of aforementioned decoding/reproduction unit and provide a recording apparatus for the recording method.

DISCLOSURE OF INVENTION

In order to solve the problems described above, the present invention provides a recording method for compressing time-series information and adding additional information for a decoding and reproduction process to data of each of decoding/reproduction units of the compressed time-series information before recording the compressed time-series information onto a recording medium. The recording medium is characterized in that the additional information added to data of each of specific decoding/reproduction units appearing at predetermined time intervals among the decoding/reproduction units is associated with management information for carrying out the decoding and reproduction process on the data of the specific decoding/reproduction units.

As described above, in accordance with the present invention, additional information for data of a decoding/reproduction unit is recorded on a recording medium, being associated with management information for carrying out a decoding and reproduction process on the data of the decoding/reproduction unit. Thus, by referring to the management information for carrying out the decoding and reproduction process, data of a decoding/reproduction unit can be reproduced by being associated with its additional information.

As a result, additional information added to data of a decoding/reproduction unit can be output with a timing of the reproduction output of the data. In addition, by using additional information added to data of a decoding/reproduction unit, a process to reproduce the data can be controlled with ease.

BRIEF DESCRIPTION OF DRAWINGS

FIG. 5 is an explanatory diagram showing other typical substantial parts of the embodiment implementing the recording method provided by the present invention;

FIGS. 9A and 9B are explanatory diagrams showing rearrangement of pictures pertaining to a GOP according to an MPEG method.

BEST MODES FOR CARRYING OUT THE INVENTION

By referring to diagrams, the following description explains embodiments implementing recording and reproduction methods of the present invention by taking a case of applying the methods to a digital camera, which employing an optical disk, as an example.

In this example, as the optical disk, a writable optical disk is employed. Examples of the writable optical disk are a DVD-R (Digital Versatile Disk—Recordable) and a DVD-RW (Digital Versatile Disk—Re-Writable). In addition, as a data compression method, an MPEG2 method is adopted, and recorded data has an MPEG2-PS (Program Stream) data structure.

Figure 1:
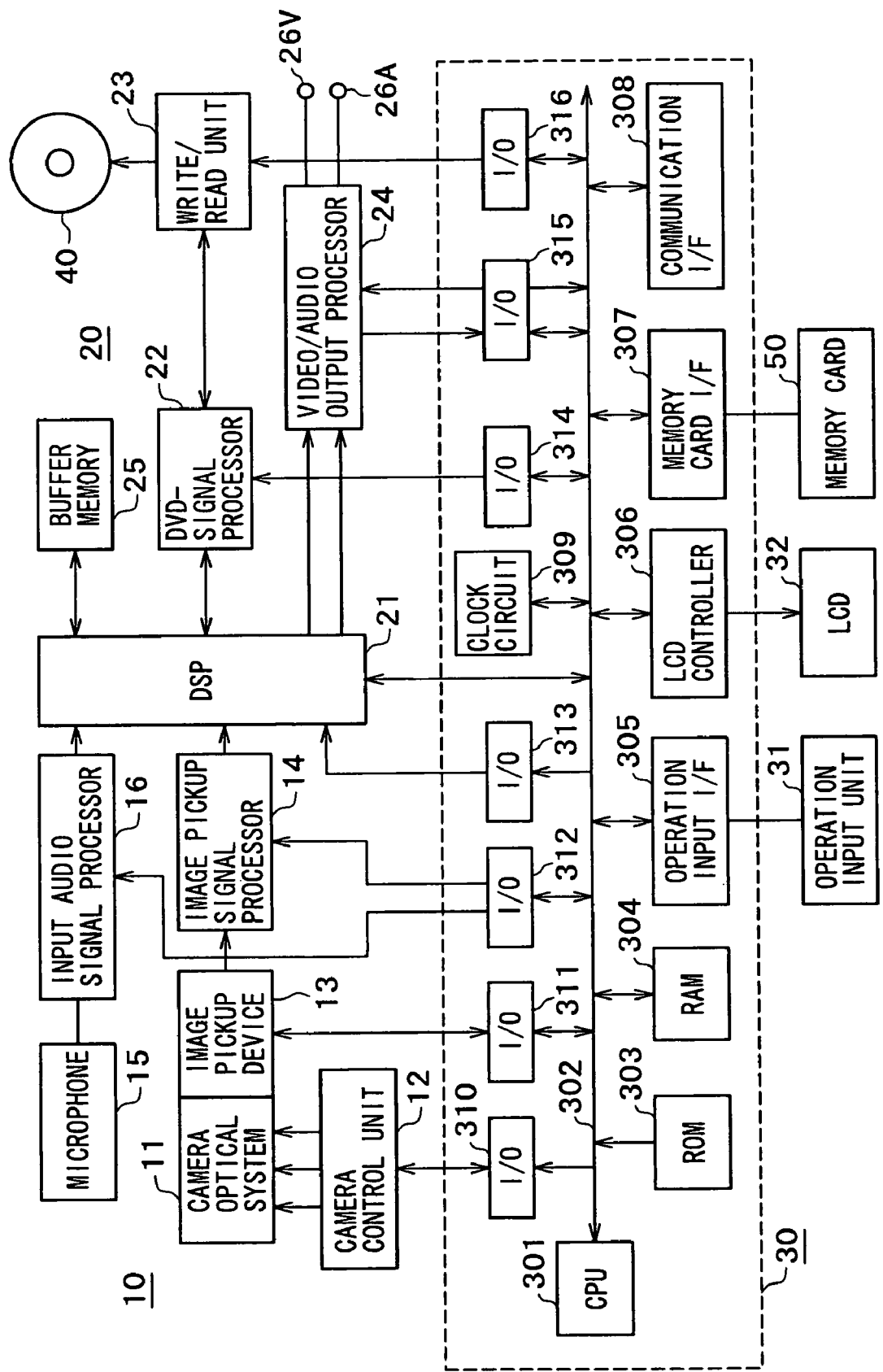
FIG. 1 is a diagram showing a typical configuration of an image pickup apparatus adopting a recording method provided by an embodiment of the present invention.

FIG. 1 is a block diagram showing a typical configuration of a digital camera provided by an embodiment. The digital camera includes a camera unit 10, a recording/reproduction-processing unit 20 and a control unit 30.

The control unit 30 includes a CPU (Central Processing Unit) 301, a system bus 302, a ROM (Read Only Memory) 303, a RAM (Random Access Memory) 304 for work area, an operation input interface 305, an LCD controller 306, a memory-card interface 307, a communication interface 308, a clock circuit 309 as well as IO ports 310, 311, 312, 313, 314, 315 and 316. The operation input interface 305 is an interface connected to an operation input unit 31. The LCD controller 306 is a controller for controlling an LCD (Liquid Crystal Display) unit 32. The memory-card interface 307 is an interface for mounting a memory card 50. The communication interface 308 is an interface with typically a USB (Universal Serial Bus). The CPU 301 is connected to the other components of the control unit 30 by the system bus 302.

The ROM 303 is used for storing control programs and other programs. The control programs include a program for controlling the camera unit 10, a program for controlling a process to record video information obtained as a result of an image pickup operation and audio information input through a microphone onto a recording medium and a program for controlling a process to reproduce recorded video information and recorded audio information.

The operation input unit 31 includes a variety of keys such as a mode-switching key for switching the digital camera from the an image pickup mode to another mode such as a reproduction mode, a zoom adjustment key, an exposure adjustment key, a shutter key, an animation-taking key and a white-balance adjustment key.

The CPU 301 analyzes an operation signal input from the operation input unit 31 through the operation input interface 305 to recognize which of the keys has been operated and carries out control processing according to a result of the recognition.

Controlled by the CPU 301, the LCD unit 32 shows a taken image and image pickup conditions along with a picture reproduced from the recording medium and its additional information also reproduced from the recording medium.

The clock circuit 309 counts pulses of a clock signal generated by a reference clock signal generation circuit not shown in the figure to produce time information including a date comprising a year, a month and a day as well as a time comprising hour, minute and second data. The clock circuit 309 has a configuration in which, by counting the number of picture frame units, the second data of a time can be obtained as information with precision covering a fraction after the decimal point.

The digital camera in this example is capable of storing data to be recorded onto an optical disk 40 and a memory card 50. In the latter case, the data is recorded onto the memory card 50 through the memory-card interface 307 as compressed data. In the following description, the optical disk 40 is referred to as a DVD 40.

The communication interface 308 typically connects this digital camera to a personal computer and functions as a component for transmitting data to be recorded to the personal computer and exchanging other data with the personal computer.

The camera unit 10 includes a camera optical system 11, a camera control unit 12, a image pickup device 13, a image pickup signal processor 14, a microphone 15 and an input audio signal processor 16.

The camera optical system 11 includes a lens group for taking an image of a photographing object, a diaphragm adjustment mechanism, a focus adjustment mechanism, a zoom mechanism, a shutter mechanism, a flash (strobe) mechanism and a hand-movement correction mechanism, which are not shown in the figure.

The camera control unit 12 receives a control signal from the I/O port 310 of the control unit 30 and generates a control signal to be supplied to the camera optical system 11. The generated control signal is supplied to the camera optical system 11 to execute various kinds of control such as zoom control, shutter control and exposure control. The control signal received at a point of time from the I/O port 310 of the control unit 30 can be a control signal representing an operation carried out on the operation input unit 31 at the point of time, or a control signal based on a photographing condition set in advance in accordance with the operation carried out on the operation input unit 31.

In this digital camera, the image pickup device 13 is a CCD (Charge Couple Device). On an image formation face of the image pickup device 13, an image input through the camera optical system 11 is created. Then, the image pickup device 13 receives a signal indicating a timing determined by the operation of the shutter to fetch the image from the I/O port 311 employed in the control unit 30. With this timing, the image pickup device 13 converts the photographing-object image created on the image formation face into an image pickup signal and supplies the image pickup signal to the image pickup signal processor 14.

The image pickup signal processor 14 carries out processing such as gamma correction and AGC (Auto Gain Control) on the image pickup signal on the basis of a control signal received from the I/O port 312 of the control unit 30. The image pickup signal processor 14 also carries out processing to convert the image pickup signal into a digital signal.

In addition, the microphone 15 collects sounds generated in-the surroundings of the photographing object at the image pickup time. The microphone 15 supplies an audio signal representing the sounds to the input audio signal processor 16.

The input audio signal processor 16 carries out processing such as correction and AGC (Auto Gain Control) on the input audio signal on the basis of a control signal received from the I/O port 312 of the control unit 30. The input audio signal processor 16 also carries out processing to convert the audio signal into a digital signal.

The digital camera shown in FIG. 1 as an example also has an external microphone terminal not shown in the figure. The external microphone terminal connects the digital camera to an external microphone. In this configuration, the input audio signal processor 16 is switched automatically to receive an audio signal from the external microphone in place of the audio signal from the embedded microphone 15.

In this digital camera, the input audio signal processor 16 carries out the AGC processing by considering a difference in characteristic between the audio signal received from the external microphone and the audio signal from the embedded microphone 15. The input audio signal processor 16 is switched from the AGC processing for an audio signal received from the external microphone to the AGC processing for the audio signal from the embedded microphone 15 and vice versa with a timing interlocked with the switching of the input audio signal processor 16 from an operation to receive an audio signal from the external microphone and an operation to receive an audio signal from the embedded microphone 15 and vice versa.

The recording/reproduction-processing unit 20 includes a DSP (Digital Signal Processor) 21, a DVD-signal processor 22, a write/read unit 23 and a video/audio-output processor 24. The DSP 21 is connected to the buffer memory 25 such as an SDRAM.

The DSP 21 receives a digital video signal from the image pickup signal processor 14 and a digital audio signal from the input audio signal processor 16 in addition to photographing-time information from the I/O port 313 of the control unit 30. The photographing-time information received from the I/O port 313 of the control unit 30 includes a photographing time for each frame unit and photographing-condition data.

The photographing time is fetched from the clock circuit 309 at each time the information on photographing is supplied to the DSP 21 from the I/O port 313 of the control unit 30. In the case of an operation to photograph a moving picture, however, at the start of the operation, information on a time, that is, information on the start time of the operation to photograph the moving picture, is fetched from the clock circuit 309 and, thereafter, a time of each frame unit or a frame number can be used as a photographing time. The time of each frame unit is a time relative to a reference time, which is the start time of the operation in this case.

On the other hand, the photographing-condition data includes information set automatically and information set by the user. Typically, the photographing-condition data includes set information such as information on exposure control, information for automatic adjustment of the white balance, a digital zoom magnification, information for correction of hand movements, an F value (or an F number), an exposure time, an AGC gain value and a lens focus distance.

In addition, in this digital camera, the photographing-time information also includes information indicating whether the embedded microphone 15 or an external microphone is used as the means for inputting audio information.

In this embodiment, the photographing-time information described above is generated as additional information for each frame unit and recorded on the recording medium as will be described later.

On the basis of camera information received from the I/O port 313, The DSP 21 executes various kinds of control such as automatic white-balance control, control for exposure correction and control according to a digital zoom magnification on the digital video signal received from the image pickup signal processor 14. Then, by adoption of the MPEG2 method, the DSP 21 compresses the digital video signal completing these kinds of control and a digital audio signal received from the input audio signal processor 16.

Subsequently, the DSP 21 carries out additional-information processing for recording inputted photographing-time information as additional information with the compressed video data and the compressed audio data.

Then, the DSP 21 carries out processing to multiplex the additional information, the compressed video data and the compressed audio data, generating a data array in an MPEG-PS format.

Subsequently, the data array generated by the DSP 21 in the MPEG-PS format is supplied to the write/read unit 23 by way of a recorded-signal sub-processor of the DVD-signal processor 22, which is controlled by the control unit 30 through the I/O port 314. The write/read unit 23 then records the data array on the DVD 40. The write/read unit 23 is also controlled by the control unit 30 through the I/O port 316.

On the other hand, data read out by the write/read unit 23 from the DVD 40 is supplied to the DSP 21 by way of the recorded-signal sub-processor of the DVD-signal processor 22.

The DSP 21 then separates the additional information, the compressed video data and the compressed audio data, which have been multiplexed in a data array, from each other. Subsequently, the DSP 21 decompresses the separated compressed video data to reproduce video data for each of frame units arranged in the original order and supplies the reproduced video data to the video/audio-output processor 24. The DSP 21 also decompresses the separated compressed audio data to reproduce audio data and supplies the reproduced audio data to the video/audio-output processor 24.

Controlled by the control unit 30 through the I/O port 315, the video/audio-output processor 24 processes video and audio data to be output and supplies the processed video and audio data to the control unit 30 by way of the I/O port 315 as digital data. The video/audio-output processor 24 also converts the processed video and audio data into analog signals to be supplied to output terminals 26V and 26A. A picture reproduced from the video data supplied to the control unit 30 by way of the I/O port 315 is displayed on the LCD unit 32 in accordance with control executed by the LCD controller 306.

[Data Compression and Multiplexing Processes]

Figure 2:
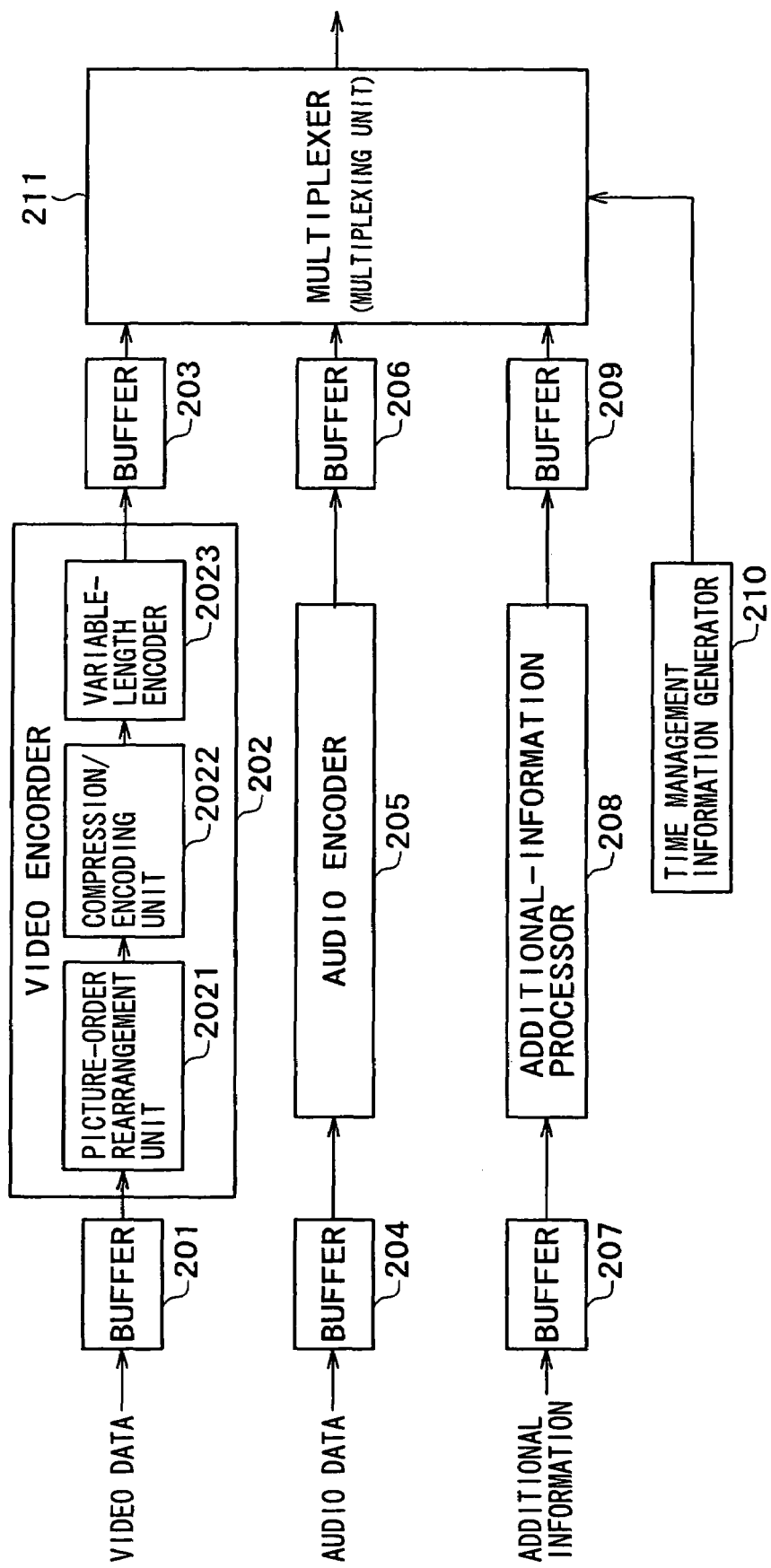
FIG. 2 is an explanatory diagram showing a typical configuration of a data-encoding and multiplexing unit employed in the image pickup apparatus shown in FIG. 1.

Next, data compression and multiplexing processes carried out by the DSP 21 are explained in detail by referring to FIG. 2 as follows.

After video data supplied by the image pickup signal processor 14 is subjected to control processing in the DSP 21 in accordance with conditions set at a photographing time and control conditions as described earlier, the video data is supplied to a video encoder 202 by way of a buffer 201.

The video encoder 202 creates a GOP comprising at least one I picture in addition to a plurality of P and B pictures. The video encoder 202 carries out a compression process in GOP units, which are each used as a unit of data written into a DVD serving as a recording medium.

To put it in detail, first of all, a picture-order rearrangement unit 2021 employed in the video encoder 202 rearranges the order of pictures in a GOP as explained earlier by referring to FIGS. 9A and 9B.

Then, a compression/encoding unit 2022 carries out an intra-frame encoding process on an I picture to compress the data of the I picture. As for a P picture, the compression/encoding unit 2022 carries out an inter-frame predictive encoding process to compress the data of the P picture by a correlation with a preceding I or P picture. As for a B picture, the compression/encoding unit 2022 carries out an inter-frame predictive encoding process to compress the data of the B picture by using a correlation with a preceding I or P picture and a correlation with a succeeding I or P picture. Some P pictures may include a picture portion that needs to be compressed in an intra-frame encoding process.

Video data completing the compression and coding process in the compression/encoding unit 2022 as described above is then supplied to a variable-length encoder 2023 for carrying out a variable-length encoding process by using Huffman codes or the like. Then, data output by the variable-length encoder 2023 is supplied to a multiplexing unit (multiplexer) 211 by way of a buffer 203.

In addition, the DSP 21 inputs audio data from the input audio signal processor 16 synchronously with an image pickup timing and supplies the data to a audio encoder 205 by way of a buffer 204. The audio encoder 205 then compresses the audio data in decoding/reproduction units, which each contain audio data of a predetermined amount. The audio data of a predetermined amount is referred to as an audio frame. The compressed and encoded audio data is then supplied to the multiplexing unit 211 by way of a buffer 206.

The DSP 21 also supplies photographing-time information received from the I/O port 313 to an additional-information processor 208 by way of a buffer 207 to generate additional information to be added to each frame unit of the image. The additional information is then supplied to the multiplexing unit 211 by way of a buffer 209.

The multiplexing unit 211 then encloses each of the video data, the audio data and the additional information in a packet, multiplexing the video data, the audio data and the additional information. In this case, a packet header is added to data of each packet or each plurality of packets to form a pack. Multiplexed data output by the multiplexing unit 211 is then supplied to the DVD-signal processor 22 to be eventually written by the write/read unit 23 onto the DVD 40 as described earlier.

In addition, in order to synchronize audio data with video data, in the MPEG method, management information referred to as a timestamp is added to each decoding/reproduction unit of the video or audio data. The decoding/reproduction unit is the frame unit in the case of video data or an audio-frame unit in the case of audio data.

The timestamp is supplied to the multiplexing unit 211 from a time management information generator 210. The timestamp has a time reference provided by an SCR (System Clock Reference).

The multiplexing unit 211 adds a timestamp to the header of a packet if the packet has a header of information of a decoding/reproduction unit. If a packet does not include a header of information of a decoding/reproduction unit, a timestamp is not added.

There are two types of timestamp, i.e., a PTS (Presentation Time Stamp) and a DTS (Decoding Time Stamp).

The PTS is time management information on an operation reproduce and output information of each decoding/reproduction unit. To put it in detail, the PTS is time management information indicating a time at which information of a decoding/reproduction unit is reproduced and output.

On the other hand, the DTS is time management information on an operation to decode information of each decoding/reproduction unit. The DTS is provided due to the fact that the reproduction/outputting order is different from the decoding order because, in the MPEG method, pictures are rearranged into a new order different from the original order in a coding process as described earlier.

If the PTS and the DTS are different from each other, both the timestamps are added to the packet header. If the PTS matches the DTS, on the other hand, only the PTS is generally added to the packet header.

As described above, the PTS is time management information conforming to the original order of frames of the video data and is added to each of the frames on a one-to-one basis. As for audio data, no DTS is added. That is to say, only the PTS is added.

By the way, in this embodiment, additional information is generated for each frame of the video data as described earlier. Also as described before, however, in the MPEG method, a contrivance is required to associate additional information for each frame with video information of the frame co-jointly with processing to rearrange pieces of video information in a coding process into a new order different from the original order. The pieces of video information each form a frame unit referred to simply as a frame.

In this embodiment, the PTS serving as the time management information mentioned above conforms to the original order of frames of video data and, by utilizing the fact that the management information corresponds to a frame on a one-to-one basis, video data of a frame unit serving as a decoding/reproduction unit is associated with additional information for the video data through the PTS. The multiplexing unit 211 carries out a process to associate video data of a frame unit with additional information for the video data.

The following description explains some typical processes carried out by the multiplexing unit 211 to associate a video frame with additional information for the video frame.

[First Typical Process to Associate a Video Frame with Additional Information]

This first typical process is carried out for a recording operation conforming to a DVD-Video format. A logical layout of data recorded on an optical disk in the DVD-Video format is shown in FIG. 3.

Figure 3:
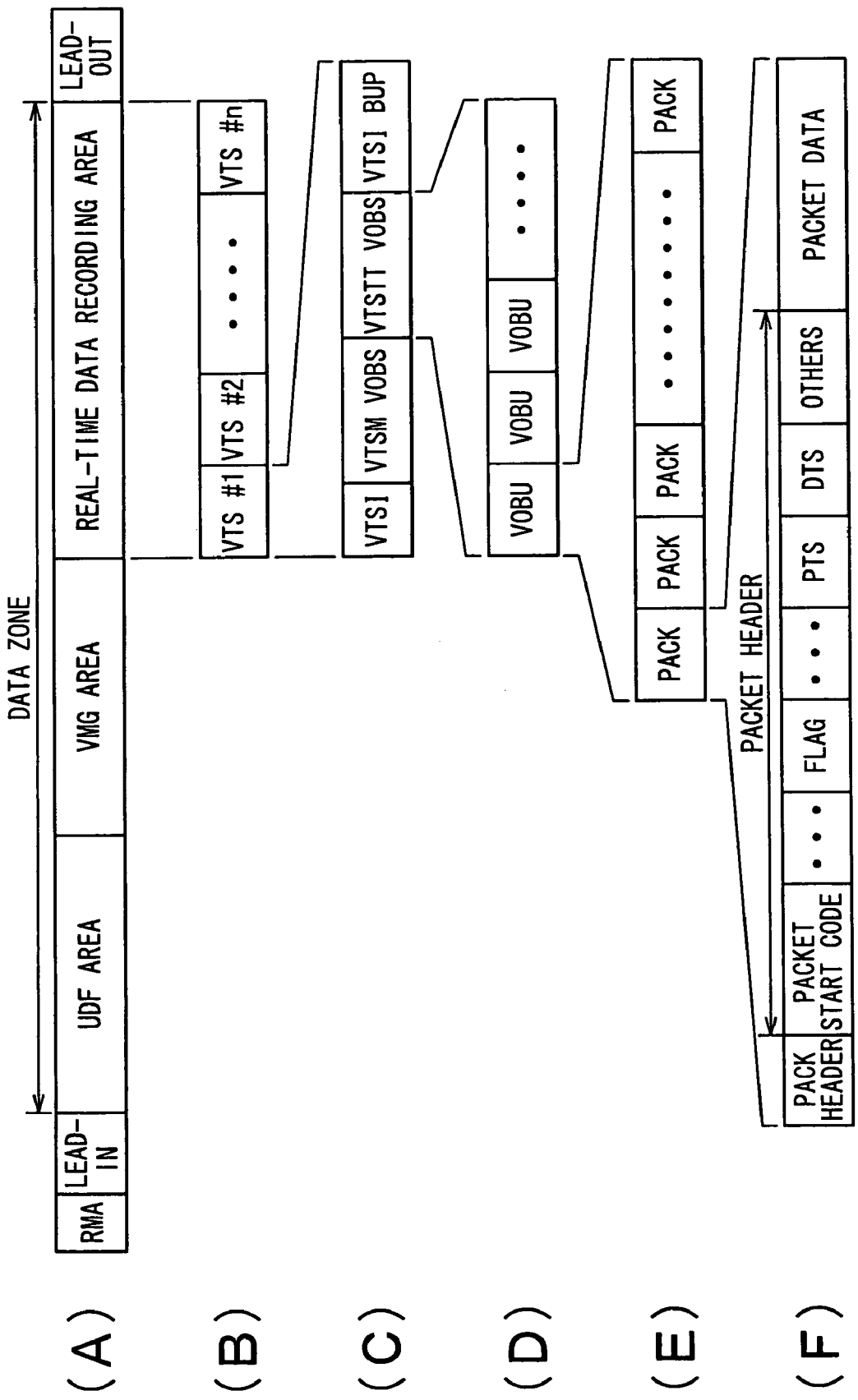
FIG. 3 is a diagram showing a logical layout on an optical disk having a DVD-Video format.

That is to say, the recording area of the optical disk is segmented into a lead-in area, a data-zone area and a lead-out area, which are arranged sequentially from the innermost circumference in the radial direction of the optical disk as shown in FIG. 3 (A). The data-zone area is an area for recording data such as management information and video data.

The data-zone area is further segmented into a UDF (Universal Disc Format) area, a VMG (Video ManaGer) area and a real-time data-recording area, which are arranged sequentially from the lead-in area side. The UDF and VMG areas are areas for recording management area for managing files of data such as video data recorded on the optical disk. Supporting UDF and ISO 9660 specifications, the UDF area is an area allowing a computer to read the optical disk. The VMG area is an area for recording information for DVD management.

The real-time data-recording area is an area for recording video and audio data. As shown in FIG. 3 (B), data is recorded in this area in data units, which are each a data group referred to as a VTS (Video Title Set).

As shown in FIG. 3 (C), each VTS comprises a VTSI (Video Title Set Information), a VTSM_VOBS (Video Object Set for the VTSMenu), a VTSTT_VOBS (Video Object Set for Titles in a VTS) and a VTSI_BUP (Backup of the VTSI).

As shown in FIG. 3 (D), the VTSTT_VOBS is used for recording data compressed in an MPEG2-PS format in read/write units, which are each an information block referred to as a VOBU (Video Object Unit). In the case of video data, a VOBU includes one GOP. In the case of audio data, on the other hand, a VOBU includes information for the one GOP. That is to say, this configuration is equivalent to a configuration in which data is recorded onto and read out from the optical disk in one-GOP units. In addition, in this embodiment, each VOBU for video data also includes additional information for video data of each of the frames composing the GOP recorded in the VOBU as will be described later.

The VTSI is used for recording management information such as information on a recording position of video data or the like. The VTSM_VOBS is used for recording a route menu of video data or the like. The VTSM_VOBS is optional. The VTSI_BUP is used for recording backup information of the VTSI.

As shown in FIG. 3 (E), the VOBU used as a read/write unit of data includes a plurality of packs PCK. A pack PCK includes one packet or a plurality of packets. In this example, a pack is assumed to include only one packet. In the DVD-Video format, the length of one pack is determined to be 2,048 bytes, which correspond to one sector.

The format of one pack in this example is shown in FIG. 3 (F). As shown in the figure, a pack header is provided at the beginning of a pack PCK. The pack header is followed by a packet header, which is followed by packet data. The packet data is video or audio data. The packet format of this video or audio data is referred to as a private-1 packet.

The pack header includes information SCR serving as a time reference described before. A packet start code is provided at the beginning of the packet header. The packet header also includes flags as well as the timestamp information PTS and DTS. The flags include PTS and DTS flags. The PTS flag indicates whether or not the timestamp PTS is included in the packet header. By the same token, the DTS flag indicates whether or not the timestamp PTS is included in the packet header. As described earlier, the pieces of timestamp information PTS and DTS are included in the packet header of a packet if the beginning of a picture is included in the packet.

In addition, in the first embodiment, additional information added to each frame forms one pack or one packet. As described before, in this example, the packet of additional information includes a timestamp PTS of video data associated with the additional information. Thus, in this example, the packet of additional information has the format of a private-1 packet. In the first embodiment, a pack of additional information is multiplexed with a pack of video data, to which the timestamp PTS is added, to precede the pack of video data.

Figure 4:
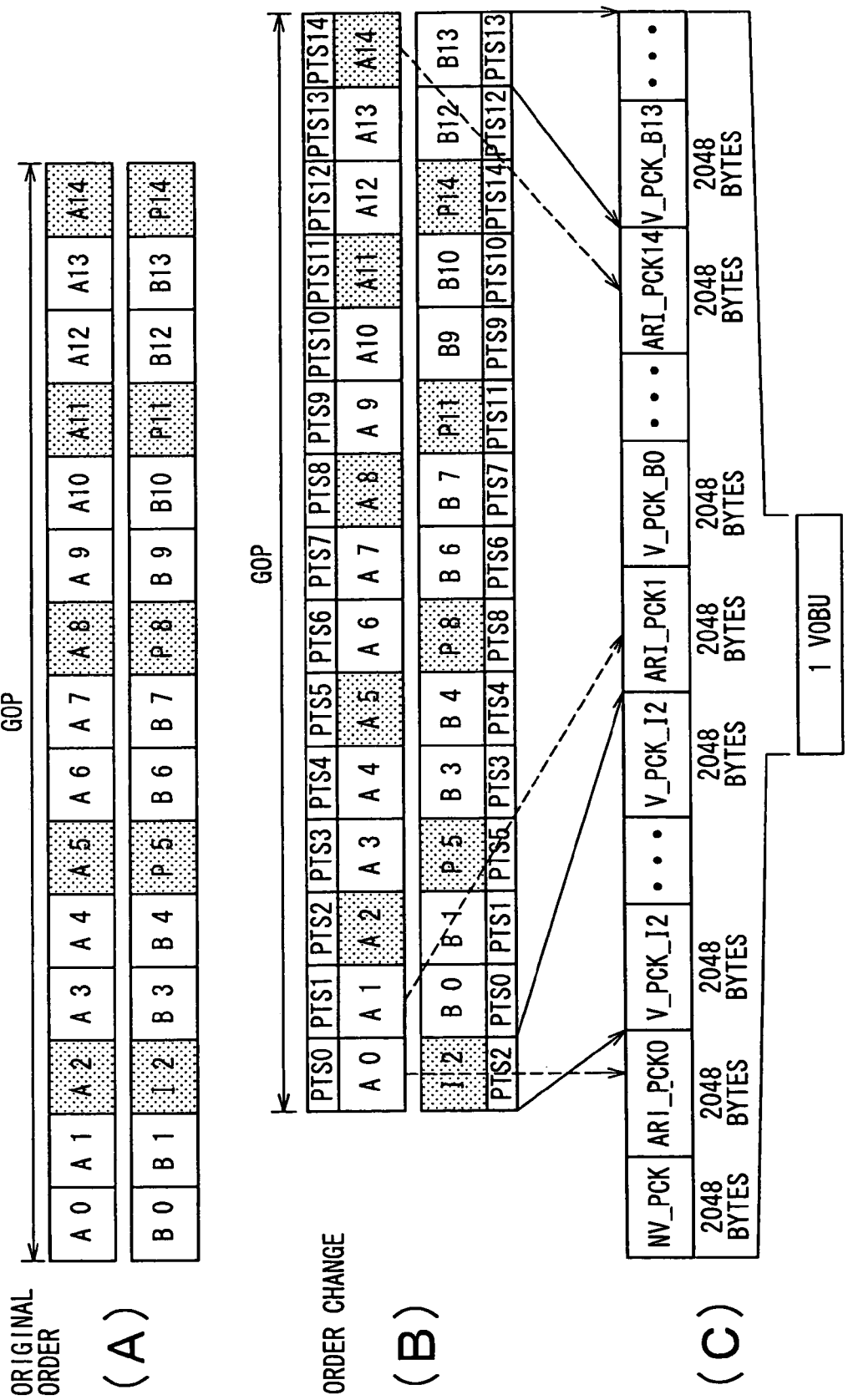
FIG. 4 is an explanatory diagram showing typical substantial parts of the embodiment implementing the recording method provided by the present invention.

A multiplexing process of the first embodiment is explained by referring to FIG. 4. FIG. 4 is an explanatory diagram referred to in description of a process to multiplex additional information and video data for video data of one GOP. In order to make the description simple, explanation of multiplexing for audio data is omitted. In this example, one GOP comprises 15 frames or 15 pictures.

FIG. 4 (A) is a diagram showing video data and additional information, which are input to the buffers 201 and 207 respectively. B0, B1, I2, B3, B4, P5 - - - and P14 each denote a frame unit of video data by explicitly indicating the picture type of each frame unit. To be more specific, B indicates B picture, I indicates I picture, P indicates P picture, and their suffix number has nothing to do with the picture type and is appended to the type of a frame unit as the sequence number of the frame unit.

Notations A0 to A14 each denote additional information added to a video frame unit having the same suffix number as the additional information. That is to say, the pieces of additional information A0 to A14 are each additional information for a video frame unit having the same suffix number as the piece of additional information.

The pieces of video data shown in FIG. 4 (A) are rearranged into a new picture order shown in FIG. 4 (B) by the picture-order rearrangement unit 2021 employed in the video encoder 202. In this example, the pieces of additional information are not rearranged so that their order shown in FIG. 4 (B) remains the same as that shown in FIG. 4 (A). Thus, the new order of the video data and the order of the additional information make it difficult to associate each picture with the additional information for the picture.

As described previously, for video data of each picture, the multiplexing unit 211 includes a timestamp PTS serving as reproduction/outputting time management information in the packet header of a packet containing the beginning of the picture. In FIG. 4 (B), timestamp PTS# shown beneath each picture is a timestamp PTS added to the picture. Notation # is a suffix number having such a value that, the smaller the value, the earlier the time represented by a timestamp to which the suffix number is appended. Since the reproduction/outputting timestamps PTS conform to the original order of the pictures, the suffix numbers of the reproduction/outputting timestamp PTS match the suffix numbers of the pictures.

By the same token, in this embodiment, the multiplexing unit 211 assigns a timestamp PTS to additional information for each picture having the same number as the timestamp PTS. Thus, even if the pictures are rearranged into a new order, by referring to the timestamp PTS assigned to the additional information, the additional information can be associated with a picture to which the additional information is added.

Then, as shown in FIG. 4 (C), compressed video data of each picture is recorded as one pack or a plurality of packs. In FIG. 4 (C), notation V_PCK denotes a video pack, which is a pack containing video data. Notation V_PCK is concatenated with notation I#, P# or B# as a tail. Notation I#, P# or B# denotes compressed video data of a picture shown in FIGS. 4 (A) or (B).

As described before, a timestamp PTS is included in the packet header of a packet containing the beginning of a picture. In this example, since one pack includes only one packet, the timestamp PTS is included in the pack containing the packet.

In this embodiment, pack ARI_PCK# of additional information where notation # denotes a suffix number is located at a position immediately preceding a video pack including a timestamp PTS as shown in FIG. 4 (C) in a multiplexing process.

It is to be noted that a pack NV_PCK at the beginning of a VOBU including data of a GOP is called a navigation pack. This is because the pack contains reproduction management information such as data search information. An example of the data search information is control information indicating to which sector a jump is to be made.

It is also worth noting that the additional information includes the photographing time or recording time of each frame unit and camera-setting information. As described earlier, the data search information includes an F number, exposure time, an exposure program, an exposure correction value, an AGC gain value, a lens focus distance, flash information, a white-balance adjustment value and a digital zoom magnification.

In the first typical processing described above, in a multiplexing process, a pack of additional information is located at a position immediately preceding each video pack V_PCK with a packet header including a timestamp PTS. However, a pack of additional information can also be located at a position immediately succeeding each of such video packs.

[Second Typical Process to Associate a Video Frame with Additional Information]

In the first typical process described above, for each of the 15 pictures composing a GOP, a pack ARI_PCK# of additional information is located at a position immediately preceding or immediately following every video pack V_PCK with a packet header including a timestamp PTS in a multiplexing process. However, packs ARI_PCK# of additional information for the 15 pictures composing a GOP can also be collected and located at a specific position inside the VOBU for the GOP.

The second typical process is a process for the case described above. FIG. 5 (A) is a diagram showing a series of VOBUs. As shown in FIG. 5 (B), each of the VOBUs includes additional-information packs ARI_PCK0 to ARI_PCK14 collected for the 15 pictures respectively at a location immediately following the navigation pack NV_PCK.

Much like the first embodiment, any particular one of the additional-information packs ARI_PCK0 to ARI_PCK14 includes the same timestamp PTS as the timestamp PTS added to a picture associated with the additional information contained in the particular additional-information pack.

As described above, the additional-information packs ARI_PCK0 to ARI_PCK14 are collected at a location immediately following the navigation pack NV_PCK. It is to be noted, however, that they can also be collected at the end of the VOBU or at a predetermined location in the mid of the VOBU.

[Data Separation and Decompression Processes]

Figure 6:
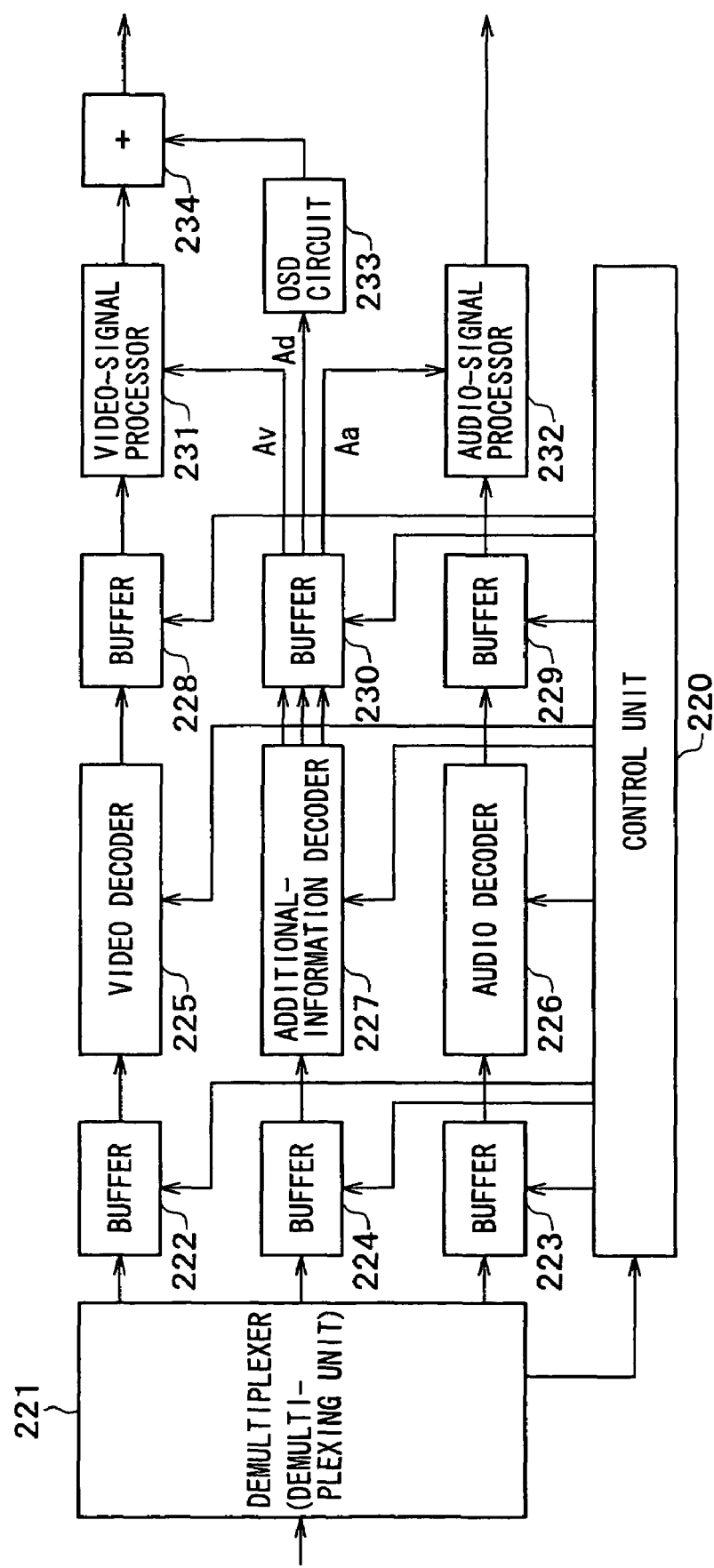
FIG. 6 is an explanatory diagram showing a typical configuration of a data separation processing unit and a data-decoding unit, which are included in the image pickup apparatus shown in FIG. 1.

By referring to FIG. 6, the following description explains a process carried out by the DSP 21 to separate video data, audio data and additional information from each other and a process carried out by the DSP 21 to decompress the video and audio data.

Data read out by the write/read unit 23 from the DVD 40 in VOBU units is separated into video-data packs, audio-data packs and additional-information packs by a demultiplexing unit 221.

The demultiplexing unit 221 then extracts a pack header and a packet header from each of the packs, supplying information included in the headers to a control unit 220. The control unit 220 analyzes the header information and extracts timestamps PTS and DTS from the header information, using the timestamps in controlling processing to decode, reproduce and output the video data, the audio data and the additional information as follows.

In the mean time, the demultiplexing unit 221 supplies compressed video data extracted from separated video-data packs to a video decoder 225 by way of a buffer 222. By the same token, the demultiplexing unit 221 supplies compressed audio data extracted from separated audio-data packs to a audio decoder 226 by way of a buffer 223. In the same way, the demultiplexing unit 221 supplies additional information extracted from separated additional-information packs to an additional-information decoder 227 by way of a buffer 224.

In accordance with control executed by the control unit 220, the video decoder 225 carries out processing to decompress the compressed video data in an order conforming to the timestamps DTS to restore video data of each frame unit and outputs the restored video data to a buffer 228. Then, the control unit 220 executes control to read out the video data of frame units from the buffer 228 in an order conforming to timestamps PTS extracted from video-data packs and supplies the video data to a video-signal processor 231.

By the same token, in accordance with control executed by the control unit 220, the audio decoder 226 carries out processing to decompress the pieces of compressed audio data sequentially to restore audio data and outputs the restored audio data to a buffer 229. Then, the control unit 220 executes control to read out the audio data of frame units from the buffer 229 in an order conforming to timestamps PTS extracted from audio-data packs and supplies the audio data to an audio-signal processor 232.

In the mean time, in accordance with control executed by the control unit 220, the additional-information decoder 227 reproduces additional information for video data of each frame unit and outputs the additional information to a buffer 230. To put it in detail, the additional information reproduced by the additional-information decoder 227 comprises video-data control information Av, audio-data control information Aa and display-use information Ad such as photographing date and times. The additional-information decoder 227 stores the video-data control information Av, the audio-data control information Aa and the display-use information Ad in the buffer 230.

Then, the control unit 220 executes control to read out additional information for video data of for each frame unit from the buffer 230 in an order conforming to timestamps PTS extracted from additional information packs, supplying the video-data control information Av to the video-signal processor 231, the audio-data control information Aa to the audio-signal processor 232 and the display-use information Ad to a OSD (On Screen Display) unit 233.

Since the control unit 220 transfers the video-data control information Av and the audio-data control information Aa from the buffer 230 to the video-signal processor 231 and audio-signal processor 232 respectively in an order conforming to timestamps PTS, the pieces of control information Av and Aa become parts of respectively video data and audio data of a frame associated with the additional information including the pieces of control information Av and Aa. That is to say, the pieces of control information Av and Aa are automatically associated with the video data and the audio data respectively. Thus, the pieces of control information Av and Aa allow proper control to be executed for the video data and the audio data respectively.

The video-signal processor 231 carries out a process according to video-data control information Av on video data. For example, the video-signal processor 231 executes video-data control according to auto white-balance adjustment set at the photographing time.

On the other hand, the audio-signal processor 232 carries out a process according to audio-data control information Aa on audio data. For example, the audio-signal processor 232 executes control of audio data in accordance with whether the audio data represents sounds recorded from the embedded microphone or an external microphone. This is because the audio data has been recorded on the recording medium with the AGC characteristic changed in dependence on whether the audio data represents sounds recorded from the embedded microphone or an external microphone.

Comprising a photographing date, a photographing time and a zoom magnification, the display-use information Aa is supplied to a synthesis 234 by way of an OSD circuit 233 to be synthesized with video data output by the video-signal processor 231. Synthesized video data generated by the synthesis 234 is supplied to the control unit 30 by way of the video/audio-output processor 24 to be displayed on the LCD unit 32.

As described above, video data of a frame and display-use information Ad of additional information for the same frame are read out from the buffers 228 and 230 respectively on the basis of the same timestamp PTS to be synthesized with each other. Thus, on the screen of the LCD unit 32, the photographing time of each frame unit is displayed correctly.

Other Embodiments

First Other Embodiment

In the embodiment described above, additional information is recorded on a recording medium as one pack for every video frame. However, additional information can also be recorded on a recording medium as one pack referred to as an additional-information pack ARI_PCK for every VOBU. In this case, pieces of additional information for the 15 pictures (or frames) of a VOBU are collectively recorded as the pack inside the VOBU.

Figure 7:
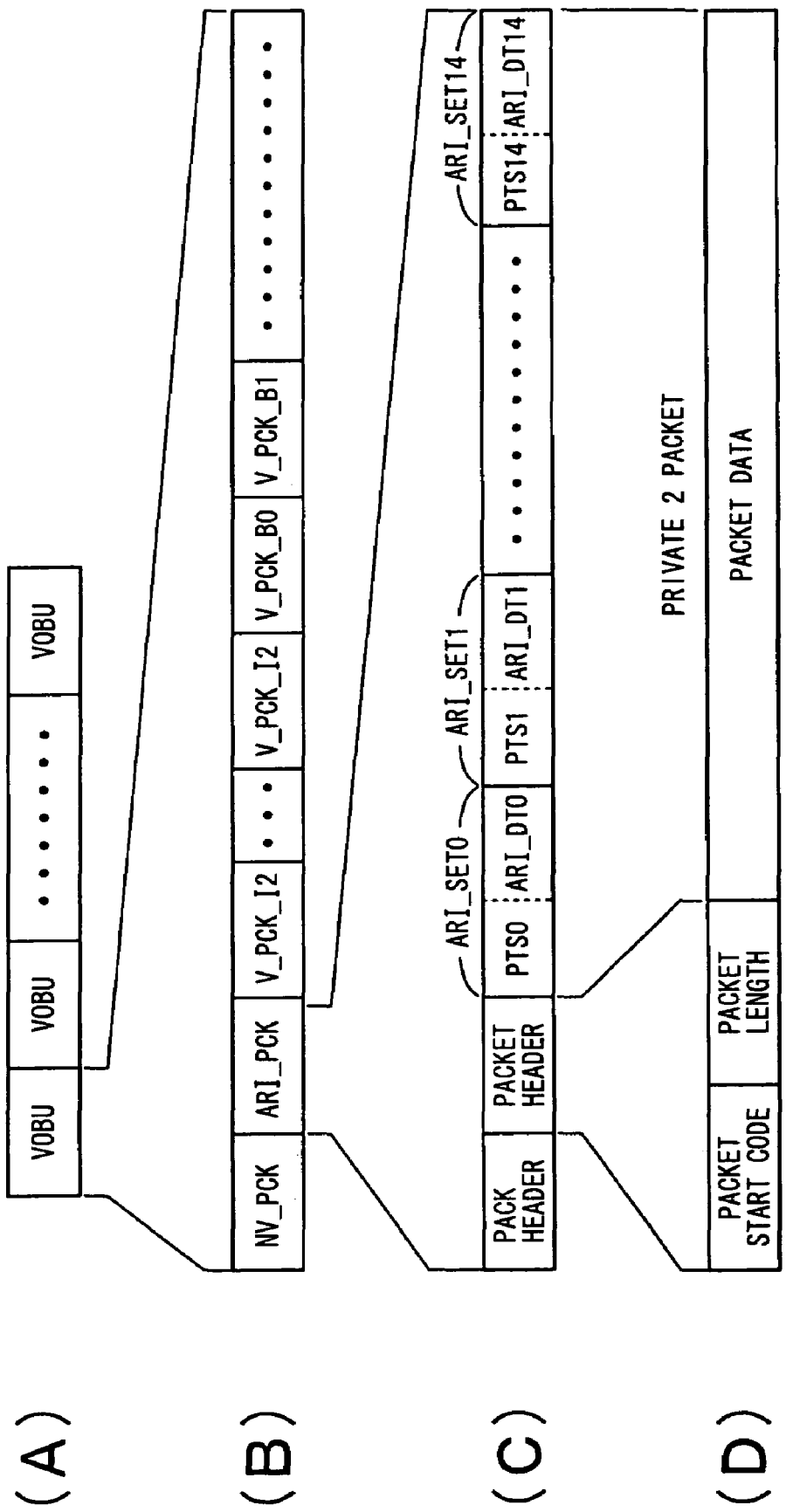
FIG. 7 is an explanatory diagram showing further typical substantial parts of the embodiment implementing the recording method provided by the present invention.

FIG. 7 is a diagram showing a typical data format for an embodiment in which pieces of additional information for the 15 frames of a VOBU are collectively recorded as the pack inside the VOBU. In this embodiment, for each of VOBUs shown in FIG. 7 (A), one pack named ARI_PCK of additional information is located at a position immediately following a navigation pack NV_PCK as shown in FIG. 7 (B).

The additional-information pack ARI_PCK includes a pair of additional information and a timestamp PTS for each of 15 picture frames composing a GOP.

To put it in detail, as shown in FIG. 7 (C), data ARI_SET# is generated for each picture frame. Data ARI_SET# is a pair consisting of data ARI_DT# of additional information for the picture frame and a timestamp PTS# added to the same picture frame as a timestamp associated with the additional information. Thus, for a GOP comprising 15 picture frames, 15 pieces of data ARI_SET0 to data ARI_SET14 are created and sequentially provided in the additional-information pack ARI_PCK.

In the case of this embodiment, as the additional-information pack ARI_PCK, a private-1 packet can be used as is the case described previously. However, a private2 packet shown in FIG. 7 (D) can also be used as well.

In the case of this embodiment, a timestamp PTS is extracted from each data ARI_SET forming a data pair as described above in an operation to reproduce data and used for finding video data and audio data of the same time in an operation to reproduce data in order to output additional information. In this way, the timestamps PTS can be used not only for controlling the video and audio data, but also used as data displayed on the screen.

Second Other Embodiment

In the example shown in FIG. 4, pieces of additional information are kept in the original time-series order as they are without regard to rearrangement of pictures into a new order and, in addition, an additional-information pack including a timestamp PTS is placed at a location preceding or succeeding a video pack V_PCK with a packet header including the timestamp PTS. In this second other embodiment, however, pieces of additional information are also rearranged into a new order as pictures of video data are and each placed at a location preceding or succeeding a video pack V_PCK with a packet header including the timestamp PTS.

Thus, in the case of the second other embodiment, every additional-information pack ARI_PCK is placed at a location adjacent to a video pack V_PCK with a packet header including the timestamp PTS, making it easy to associate the additional-information and video packs with each other.

Third Other Embodiment

In accordance with the second other embodiment described above, every pack ARI_PCK containing additional information is placed at a location preceding or succeeding a video pack V_PCK, that includes video data of a picture frame corresponding to the additional information and has a packet header including the same timestamp PTS as the pack ARI_PCK, making it easy to associate the picture frame with the additional information for the picture frame even if the timestamps PTS do not exist.

In a third other embodiment, much like the second other embodiment, every pack ARI_PCK containing additional information is placed at a location preceding or succeeding a video pack V_PCK that includes video data of a picture frame corresponding to the additional information and has a packet header including a timestamp PTS. However, no timestamp PTS is included in any pack of additional information. Thus, in the third other embodiment, as a packet of every pack of additional information, the private2 packet shown in FIG. 7 (D) can be used.

In addition, in the case of the third other embodiment, at a reproduction time, additional information for each picture frame is extracted in accordance with a relation between the recording locations of the additional information and the picture frame. In addition, on the basis of timestamps PTS, the reproduction and output process is managed whereas pieces of additional information corresponding to picture frames are rearranged back into the original order before being reproduced and output. In this way, the additional information can be associated with the video and audio data, which is reproduced and output as restored original data, and utilized as control-use information and display-use information.

Fourth Other Embodiment

A fourth other embodiment is a modified configuration of the example shown in FIG. 5. To put it in detail, each additional-information pack ARI_PCK does not include a timestamp PTS. Thus, in the fourth other embodiment, in a process to restore video data, pieces of video data will be reproduced in a picture order (or a frame order) based on timestamps PTS. For this reason, the additional-information packs ARI_PCK need to be arranged in advance into the same order as the PTS-based picture order in which the pieces of video data are to be reproduced. Thus, the additional-information packs ARI_PCK are arranged in advance into an order shown in FIG. 5 (B).

In addition, in the case of the fourth other embodiment, at a reproduction time, pieces of additional information for their respective picture frames are output sequentially one after another to accompany their respective picture frames, which are reproduced and output after the order of the picture frames is restored to the original picture order. In this way, the additional information can be associated with the video and audio data, which is reproduced and output as restored original data, and utilized as control-use information and display-use information.

Fifth Other Embodiment

In the embodiments described above, the present invention is applied to recording of data onto a recording medium in the DVD-Video format. By carrying out the processing in exactly the same way as the embodiments described so far, however, the present invention can also be applied to data of VOBUs conforming to a DVD-Video Recording (DVD-VR) format.

Figure 8:
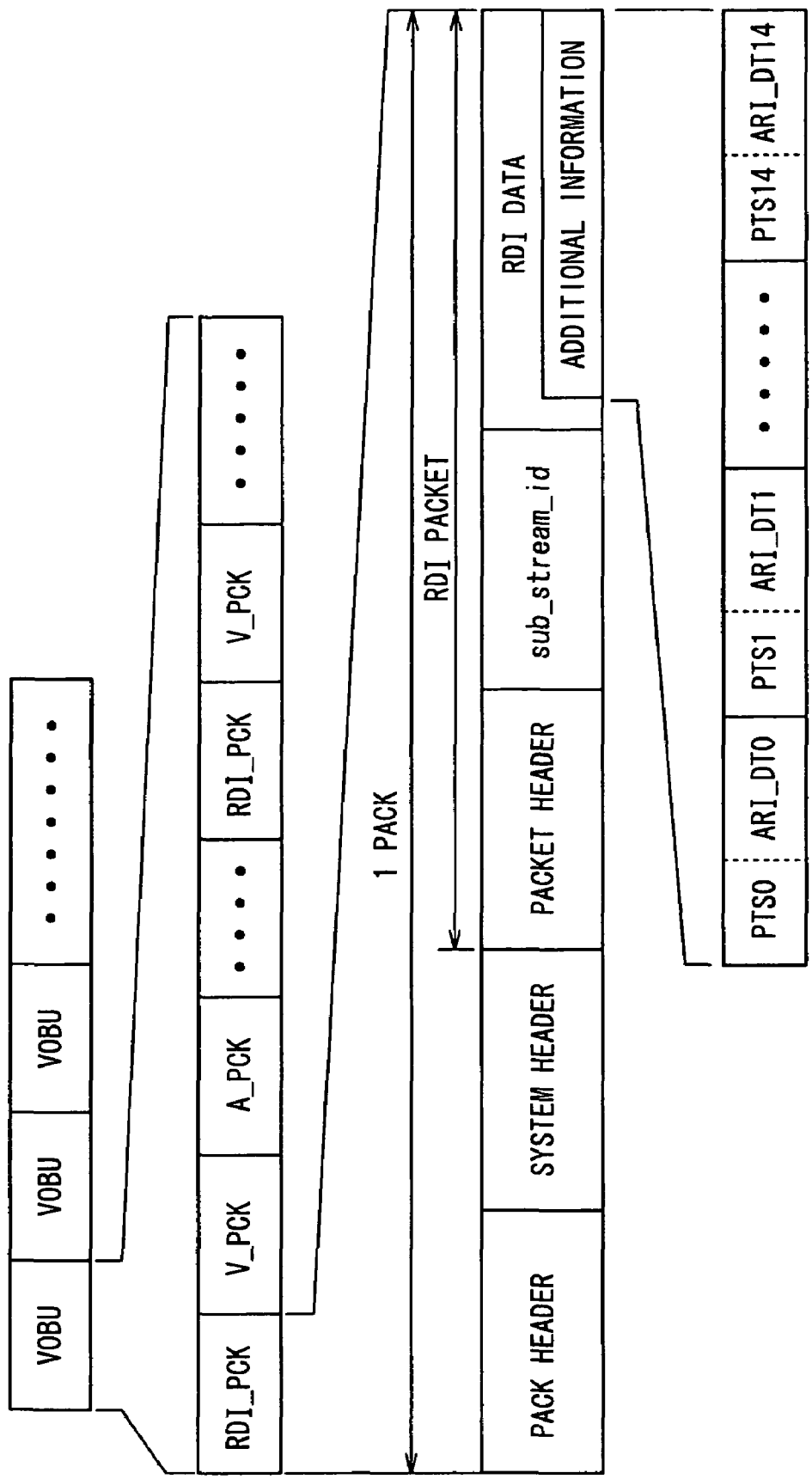
FIG. 8 is an explanatory diagram showing still further typical substantial parts of the embodiment implementing the recording method provided by the present invention.

In addition, in the case of the DVD-VR format, pieces of additional information can be laid out to form the same array shown in FIG. 7 in an RDI-data area of an RDI packet as shown in FIG. 8. As shown in the figure, the RDI packet is included in a pack RDI_PCK located at the beginning of each VOBU.

Sixth Other Embodiment

In the embodiments described so far, additional information is generated for each picture frame and added to the frame. However, additional information does not have to be generated for each picture frame.

The sixth embodiment is an embodiment in which additional information is not generated for each picture frame. In this embodiment, for example, additional information is generated for 1 of 2, 3, - - - or 15 picture frames. That is to say, additional information is generated at predetermined time intervals each corresponding to a decoding/reproduction unit comprising a plurality of picture frames. The additional information is then recorded by being associated with management information for a decoding/reproduction process for the picture frames.

By using timestamps PTS described earlier as the management information for a decoding/reproduction process, additional information for each plurality of picture frames can reproduced and utilized with ease synchronously with reproduction of video data included in the picture frames at predetermined time intervals each corresponding to a decoding/reproduction unit.

It is to be noted that, if recording times are used as the additional information, for example, a recording time of a picture frame with no additional information can be found with ease by computation from recording times recorded as additional information. In addition, additional information recorded for a specific picture frame can be used as additional information of picture frames in the vicinity of the specific picture frame.

[Other Modifications]

It is to be noted that applications of the recording and reproduction methods provided by the present invention are not limited to the image pickup apparatus described above. It is needless to say that the recording and reproduction methods provided by the present invention can be applied to a variety of electronic apparatus for compressing video and audio data as well as recording the compressed data.

In addition, in the embodiments described above, the case that the additional information is added to one frame unit of the video data is mainly described, however, the additional information can be added to the frame unit of the audio data as a decoding/reproduction unit.

As described above, in accordance with the recording method provided by the present invention, additional information for data of each decoding/reproduction unit is recorded onto a recording medium in a state allowing the additional information to be associated with the data of the decoding/reproduction unit with a high degree of reliability.

In addition, in accordance with the reproduction method provided by the present invention, signal control such as correction control can be executed on the basis of additional information, and additional information for a decoding/reproduction unit can be synthesized with display-use information for the same decoding/reproduction unit so that these pieces of information can be displayed at the same time. This is because additional information for data of each decoding/reproduction unit is recorded onto a recording medium in a state allowing the additional information to be associated with the data of the decoding/reproduction unit with a high degree of reliability.

The invention claimed is:

1. A method of recording data to a computer readable storage medium comprising:
   identifying time-series information as a read/write unit serving as a unit, in which data is written onto said storage medium and read out from said storage medium, including a plurality of decoding/reproduction units;
   carrying out data compression on the time-series information including, generating management information in respective decoding/reproduction units of said time-series information and generating additional information for one or more decoding/reproduction units of said time-series information, said management information for use in a decoding/reproduction process for decoding and reproducing said time-series information, said additional information including a predetermined condition when said time-series information is retrieved; and
   recording said time-series information once compressed, said management information, and said additional information onto the computer readable storage recording medium wherein said additional information and said management information is recorded as decoding/reproduction units within a read/write unit of said storage medium, wherein
   said additional information is recorded logically just after said management information.

2. The recording method according to claim 1, wherein,
   data of a read/write unit serving as a unit, in which data is written onto said recording medium and read out from said recording medium, includes a plurality of said decoding/reproduction units of said time-series information; and
   the sequence of pieces of data included in said decoding/reproduction units pertaining to said read/write unit in a time-series direction is changed.

3. The recording method according to claim 2, whereby additional information for data of said predetermined-interval decoding/reproduction unit is recorded by placing management information for a decoding/reproduction process for data of a corresponding one of said decoding/reproduction units at a predetermined location in data of said read/write unit.

4. The recording method according to claim 2, wherein,
   data of said read/write unit comprises a plurality of packets; and
   additional information for data of said predetermined-interval decoding/reproduction unit is recorded in data of said read/write unit as a packet including management information for a decoding/reproduction process for data of a corresponding one of said decoding/reproduction units.

5. The recording method according to claim 2, wherein,
   data of said read/write unit comprises a plurality of packets;
   a specific packet is selected among said packets of said time-series information completing said data compression; and
   additional information for data of said predetermined-interval decoding/reproduction unit is recorded at a location determined as a location relative to said specific packet including management information for a decoding/reproduction process for a corresponding one of said decoding/reproduction units.

6. The recording method according to claim 1, wherein said management information added to data of said decoding/reproduction unit as management information for said decoding/reproduction process is time management information on a reproduction/output timing of said data.

7. The recording method according to claim 1, wherein said additional information includes at least information on a time at which data of said decoding/reproduction unit of said time-series information is acquired.

8. A recording method according to claim 1, wherein said additional information includes information on a condition in which data of said decoding/reproduction unit of said time-series information is acquired.

9. The recording method according to claim 1, wherein,
   said time-series information is video information;
   data of said decoding/reproduction unit is information of a field unit or a frame unit; and
   said data compression uses a correlation with data of said decoding/reproduction unit.

10. The recording method according to claim 1, wherein a data size of each additional information is constant.

11. The recording method according to claim 1, wherein said additional information includes time information of said time-series information.

12. The recording method according to claim 1, wherein said additional information includes condition information of said time-series information.

13. A recording apparatus having a recording medium comprising:
    a data input device for receiving time-series information as a read/write unit serving as a unit, in which data is written onto said recording medium and read out from said recording medium, including a plurality of decoding/reproduction units;
    a data compression device for carrying out data compression on the time-series information;
    a management-information generation device for generating management information in respective decoding/reproduction units of said time-series information for use in a decoding/reproduction process for decoding and reproducing said time-series information;
    an additional-information generation device for generating additional information for one or more decoding/reproduction units of said time-series information that includes a predetermined condition when said time-series information is retrieved; and
    a recording control device for recording said time-series information once compressed on said recording medium wherein said additional information and said management information is recorded as decoding/reproduction units within a read/write unit of said recording medium, and recording said management information generated by said management-information generation device and said additional information by said additional-information generation device on said recording medium, wherein
    said additional information is recorded logically just after said management information.

14. The recording apparatus according to claim 13, wherein,
    said recording control device generates data including a plurality of said decoding/reproduction units of said time-series information as data of a read/write unit serving as a unit, in which data is written onto said recording medium and read out from said recording medium; and the sequence of pieces of data included in said decoding/reproduction units pertaining to said read/write unit in a time-series direction is changed.

15. The recording apparatus according to claim 14, wherein said recording control device records additional information for data of said predetermined-interval decoding/reproduction unit by placing management information for a decoding/reproduction process for data of a corresponding one of said decoding/reproduction units at a predetermined location in data of said read/write unit.

16. The recording apparatus according to claim 14, wherein,
    data of said read/write unit comprises a plurality of packets; and
    said recording control device records additional information for data of said predetermined-interval decoding/reproduction unit in data of said read/write unit as a packet including management information for a decoding/reproduction process for data of a corresponding one of said decoding/reproduction units.

17. The recording apparatus according to claim 14, wherein,
    data of said read/write unit comprises a plurality of packets;
    a specific packet is selected among said packets of said time-series information completing said data compression; and
    said recording control device records additional information for data of said predetermined-interval decoding/reproduction unit at a location determined as a location relative to said specific packet including management information for a decoding/reproduction process for a corresponding one of said decoding/reproduction units.

18. The recording apparatus according to claim 13, wherein said management information added to data of said decoding/reproduction unit as management information for said decoding/reproduction process is time management information on a reproduction/output timing of said data.

19. The recording apparatus according to claim 13, wherein said additional information includes at least information on a time at which data of said decoding/reproduction unit of said time-series information is acquired.

20. The recording apparatus according to claim 13, wherein,
    said time-series information is video information;
    data of said decoding/reproduction unit is information of a field unit or a frame unit; and
    said data compression uses a correlation with data of said decoding/reproduction unit.

21. The recording apparatus according to claim 13, wherein a data size of each additional information is constant.

22. The recording apparatus according to claim 13, wherein said additional information includes time information of said time-series information.

23. The recording apparatus according to claim 13, wherein said additional information includes condition information of said time-series information being generated.

24. A reproduction apparatus for a recording medium having recorded thereon, compressed time-series information as a read/write unit serving as a unit, in which data is written onto said recording medium and read out from said recording medium, including a plurality of decoding/reproduction units, management information for a decoding/reproduction process to data included in each of said decoding/reproduction units of said time-series information, and additional information for one or more decoding/reproduction units of said time-series information that includes a predetermined condition when said time series information is retrieved, wherein said additional information and said management information is recorded as decoding/reproduction units within a read/write unit of said recording medium, and said additional information is recorded logically just after said management information, said apparatus comprising:
    a read device for reading out said compressed time-series information and said additional information from said recording medium;
    a separation device for separating said compressed time-series information and said additional information, which have been read out by said read device;
    a decompression device for decompressing said compressed time-series information separated by said separation device;
    a first reproduction/output device for reproducing and outputting said decompressed time-series information by using management information for said decoding/reproduction process; and
    a second reproduction/output device for reproducing and outputting said additional information output by said separation device synchronously with an operation to reproduce and output data of said decoding/reproduction unit of said time-series information by using management information for said decoding/reproduction process.

25. A reproduction apparatus for a recording medium having recorded thereon, compressed time-series information as a read/write unit serving as a unit, in which data is written onto said recording medium and read out from said recording medium, including a plurality of decoding/reproduction units, management information for a decoding/reproduction process to data included in each of said decoding/reproduction units of said time-series information, and additional information for one or more decoding/reproduction units of said time-series information that includes a predetermined condition when said time series information is retrieved, wherein said additional information and said management information is recorded as decoding/reproduction units within a read/write unit of said recording medium, and said additional information is recorded logically just after said management information, said apparatus comprising:
    a read device for reading out said compressed time-series information and said additional information from said recording medium;
    a separation device for separating said compressed time-series information and said additional information, which have been read out by said read device;
    a decompression device for decompressing said compressed time-series information separated by said separation device;
    a reproduction/output device for reproducing and outputting said decompressed time-series information by using management information for said decoding/reproduction process; and
    a reproduction/control device for reproducing said additional information output by said separation device in synchronization with an operation to reproduce and output data of said decoding/reproduction unit of said time-series information by using management information for said decoding/reproduction process, and controlling data of a corresponding one of said decoding/reproduction units on the basis of said generated additional information.

26. An image pickup apparatus comprising:
an image pickup device;
a data compression device for carrying out a data compression process on image data output by said image pickup device;
a time-series information identifying device for identifying time-series information as a read/write unit serving as a unit, in which data is written onto a recording medium and read out from said recording medium, including a plurality of decoding/reproduction units;
a time-management information generation device for generating time-management information in respective decoding/reproduction units of said time-series information and additional information for one or more decoding/reproduction units of said time-series information, said time-management information for use in a decoding/reproduction process for said image data, said additional information including a predetermined condition when said image data is retrieved; and
a recording control device for recording said image data once compressed on a recording medium wherein said additional information and said management information is recorded as decoding/reproduction units within a read/write unit of said recording medium, and recording said additional information generated by said additional-information generation device on said recording medium logically just after said management information.

27. The image pickup apparatus according to claim 26, wherein,
said recording control device generates data including a plurality of said decoding/reproduction units of said image data as data of a read/write unit serving as a unit, in which data is written onto said recording medium and read out from said recording medium; and
the sequence of pieces of data included in said decoding/reproduction units pertaining to said read/write unit in a time-series direction is changed.

28. The image pickup apparatus according to claim 26, wherein said recording control device records additional information for data of said predetermined-interval decoding/reproduction unit by placing management information for a decoding/reproduction process for data of a corresponding one of said decoding/reproduction units at a predetermined location in data of said read/write unit.

29. The image pickup apparatus according to claim 26, wherein,
data of said read/write unit comprises a plurality of packets; and
said recording control device records additional information for data of said predetermined-interval decoding/reproduction unit in data of said read/write unit as a packet including management information for a decoding/reproduction process for data of a corresponding one of said decoding/reproduction units.

30. The image pickup apparatus according to claim 26, wherein,
data of said read/write unit comprises a plurality of packets;
a specific packet is selected among said packets of said compressed time-series information; and
said recording control device records additional information for data of said predetermined-interval decoding/reproduction unit at a location determined as a location relative to said specific packet including management information for a decoding/reproduction process for a corresponding one of said decoding/reproduction units.

31. The image pickup apparatus according to claim 26, wherein said additional information includes at least information on a time at which data of said decoding/reproduction unit of said image data is acquired.

32. The image pickup apparatus according to claim 26, wherein,
data of said decoding/reproduction unit is information of a field unit or a frame unit; and
said data compression process uses a correlation with data of said decoding/reproduction unit.

33. The image pickup apparatus according to claim 26, wherein a data size of each additional information is constant.

34. The image pickup apparatus according to claim 26, wherein said additional information includes time information of said image data being generated by said image pickup device.

35. The image pickup apparatus according to claim 26, wherein said additional information includes condition information of said image data being generated by said image pickup device.

* * * * *